United States Patent

Eschweiler, Jr. et al.

[11] Patent Number: 5,165,044
[45] Date of Patent: Nov. 17, 1992

[54] SCANNER ADJUSTMENT DEVICE

[75] Inventors: Earl E. Eschweiler, Jr., Norwalk; Edward M. Ifkovits, New Fairfield, both of Conn.

[73] Assignee: Pitney Bowes Inc., Stamford, Conn.

[21] Appl. No.: 632,806

[22] Filed: Dec. 24, 1990

[51] Int. Cl.⁵ .................... G06K 13/20; G06K 13/00; B07C 5/344; B07C 5/00
[52] U.S. Cl. .................................. 235/475; 235/454; 235/482; 235/484; 209/569; 209/583; 209/584
[58] Field of Search ............. 235/475, 449, 454, 482, 235/484, 485; 209/569, 583, 584; 271/258, 265

[56] References Cited

U.S. PATENT DOCUMENTS

| | | | |
|---|---|---|---|
| 3,218,440 | 11/1965 | Albosta | 235/61.11 |
| 3,600,593 | 8/1971 | Berler | 250/219 |
| 3,824,376 | 7/1974 | Fox | 235/61.11 J |
| 3,983,366 | 9/1976 | Gunn | 235/61.11 R |
| 3,984,049 | 10/1976 | Shawen | 235/61.11 D |
| 4,098,458 | 7/1978 | Auchinleck | 235/475 |
| 4,110,803 | 8/1978 | Townsend | 235/449 |
| 4,317,029 | 2/1982 | Warthan | 235/454 |
| 4,396,902 | 8/1983 | Warthan et al. | 235/485 |
| 4,800,259 | 1/1989 | Steele et al. | 235/483 |
| 4,877,229 | 10/1989 | Delbe et al. | 271/265 |
| 4,935,916 | 6/1990 | Suzuki et al. | 235/454 |
| 4,954,698 | 9/1990 | Yasunaga et al. | 235/482 |
| 4,970,654 | 11/1990 | Francisco | 364/468 |

OTHER PUBLICATIONS

IBM Technical Disclosure Bulletin—U. D. Rusch vol. 11 No. 1 Jun. 1968.

Primary Examiner—Stuart S. Levy
Assistant Examiner—Tan Nguyen
Attorney, Agent, or Firm—Charles R. Malandra, Jr.; David E. Pitchenik; Melvin J. Scolnick

[57] ABSTRACT

An apparatus for adjustably positioning a scanner along a transport deck includes a cartridge; and a belt structure rotatably mounted in said cartridge, for positioning the scanner transversely along the transport deck. The belt structure includes a reach parallel to the transport deck having an aperture at which the scanner can be mounted. There is adjustment structure, adjacent the belt structure, for rotating the belt structure to adjust the position of the aperture.

11 Claims, 3 Drawing Sheets

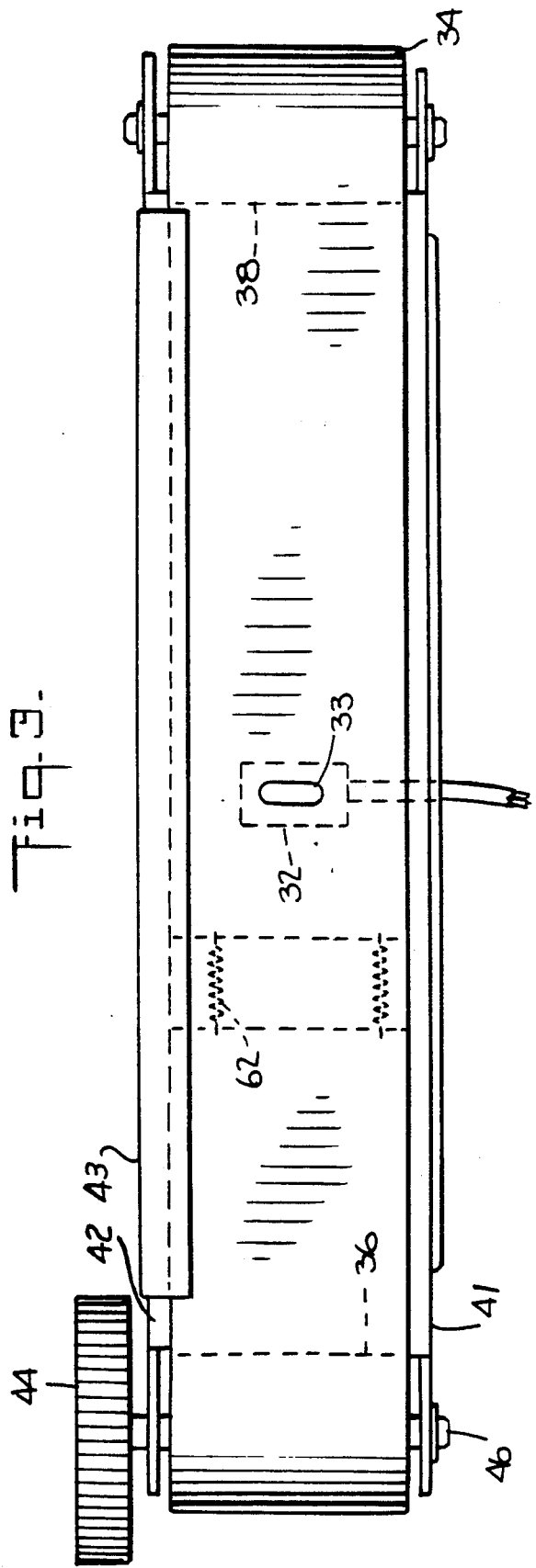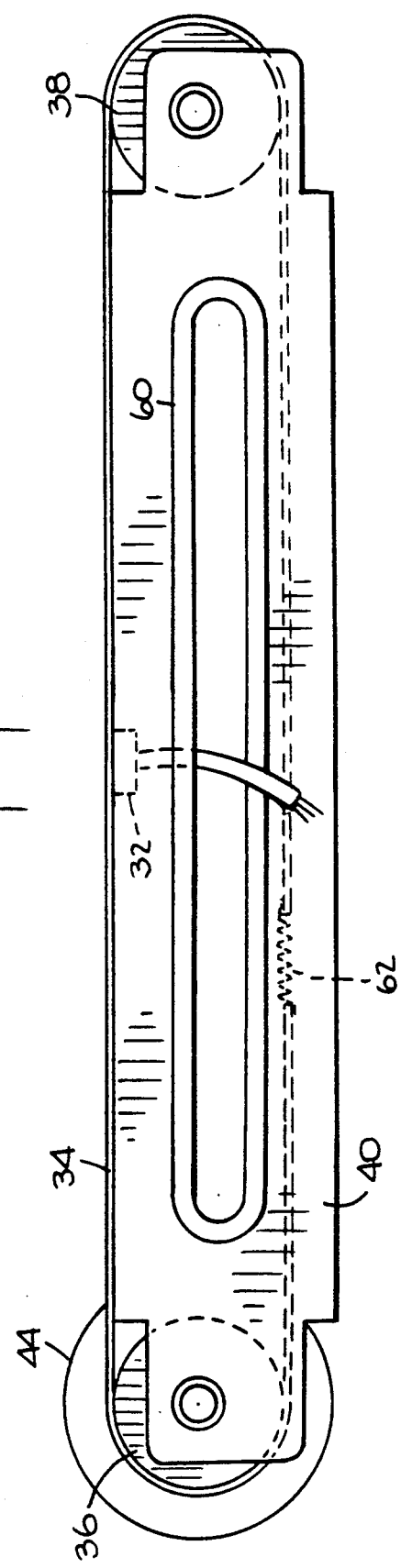

SCANNER ADJUSTMENT DEVICE

FIELD OF THE INVENTION

This invention relates to an adjustment device for an optical scanner and in particular an adjustment device for an optical scanner on an inserter machine.

BACKGROUND OF THE INVENTION

Scanners are used on inserters for scanning control codes and other information encoded on enclosures or envelopes. Generally, a scanner is mounted below a deck for scanning through an aperture in the deck. The scanner scans a predetermined segment of an enclosure or envelope, on which the control code is printed, as such segment passes over the scanner. Typically, the control code is located along one edge of the enclosure or envelope. This requires the aperture in the deck be located at a position over which the edge of the enclosure or envelope passes.

Problems with paper jams have been experienced when a corner of the leading edge of the enclosure or envelope being scanned has been caught in the aperture. The frequency of paper jams during an operation of the inserter will depend on the size of the aperture, the characteristics of the material being scanned and the proximity of the control code to the edge of the document. For larger apertures, thinner material, or a control code printed right on the edge of the document, the likelihood of a paper jam occurring is increased.

There is another a problem with a fixed aperture in the feed deck. Having a fixed location for the aperture limits the flexibility to handle codes positioned at a different location or codes encoded on different sized material. Typically, a reconfiguration of the deck by a service technician is required when the inserter is used to handle material of a different size or control code format.

Present set-up procedures requires the use of a tool to remove the sensor from its previous position and to remount the sensor at its new position. A test is then performed to determine if the sensor is in the correct position. Generally, this procedure must be repeated several times until the test confirms that the sensor is in the correct position for a particular set of sheets being processed on the inserter machine. At best, such procedures are time consuming and tedious on a table top inserter because of the limited space available for access to the sensor location.

Solutions for solving the foregoing problems are disclosed in U.S. patent applications Ser. Nos. 430,758 and 430,753 both filed on Nov. 2 1989 and assigned to the assignee of the present invention. The solutions included a transparent transport deck with a scanner adjustably mounted by velcro and positioned below the transport deck. These solutions, which require physical access to the scanner location under the deck, work well for some inserters, such as Pitney Bowes 8300 series console inserters. However, they are less suitable for table top inserters because of the accessibility constraints caused by the size of the machine. Another limitation with these solutions is that they require a service technician to make the adjustments.

SUMMARY OF THE INVENTION

The foregoing problems concerning set-up procedures, paper jams and lack of flexibility in handling marks encoded at different locations along the feed deck, are overcome by the present invention. It has been found that a scanner assembly having a scanner mounted to an adjustably positioned belt, which is mounted transversely to the transport deck, provides an easy adjustment of the scanner's position.

Accordingly, the present invention provides an apparatus for adjustably positioning an scanner along a transport deck. The apparatus comprises a cartridge; belt means, rotatably mounted in said cartridge, for positioning the scanner transversely along the transport deck, said belt means including a reach parallel to the transport deck having an aperture at which the scanner can be mounted; adjustment means, adjacent said belt means, for rotating said belt means to adjust the position of said aperture.

BRIEF DESCRIPTION OF THE DRAWINGS

Further features and advantages of the apparatus in accordance with the invention will be clearly seen and more easily understood from the description of the figures wherein:

FIG. 3 is a top view of the apparatus of the present invention seen in FIG. 1.

FIG. 4 is a front view of the apparatus seen in FIG. 1.

DETAILED DESCRIPTION OF THE PREFERRED EMBODIMENT

Figure 1:
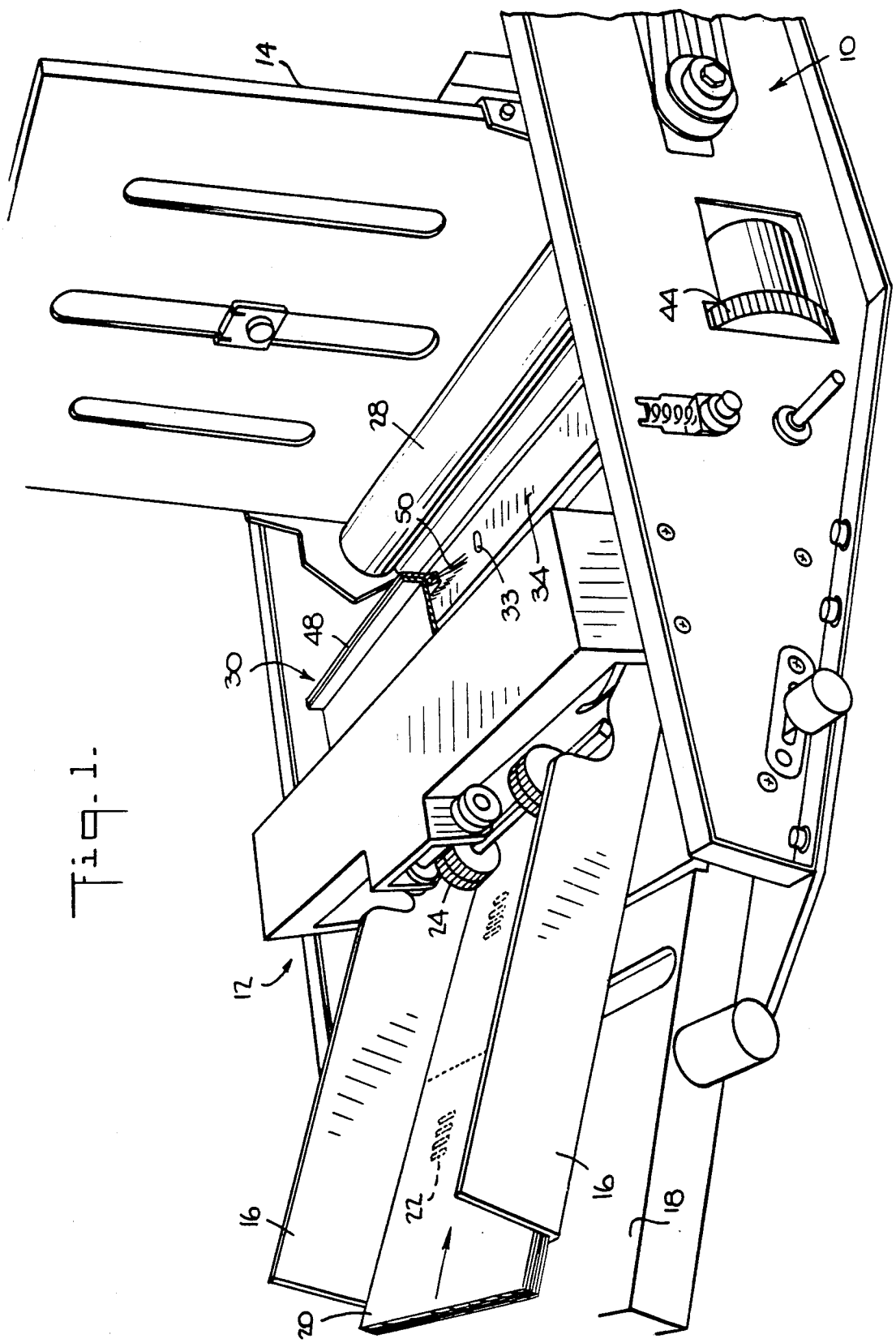
FIG. 1 is a perspective view of an inserter including an optical scanner, adjustment apparatus of the present invention positioned downstream from a feed station.
Figure 2:
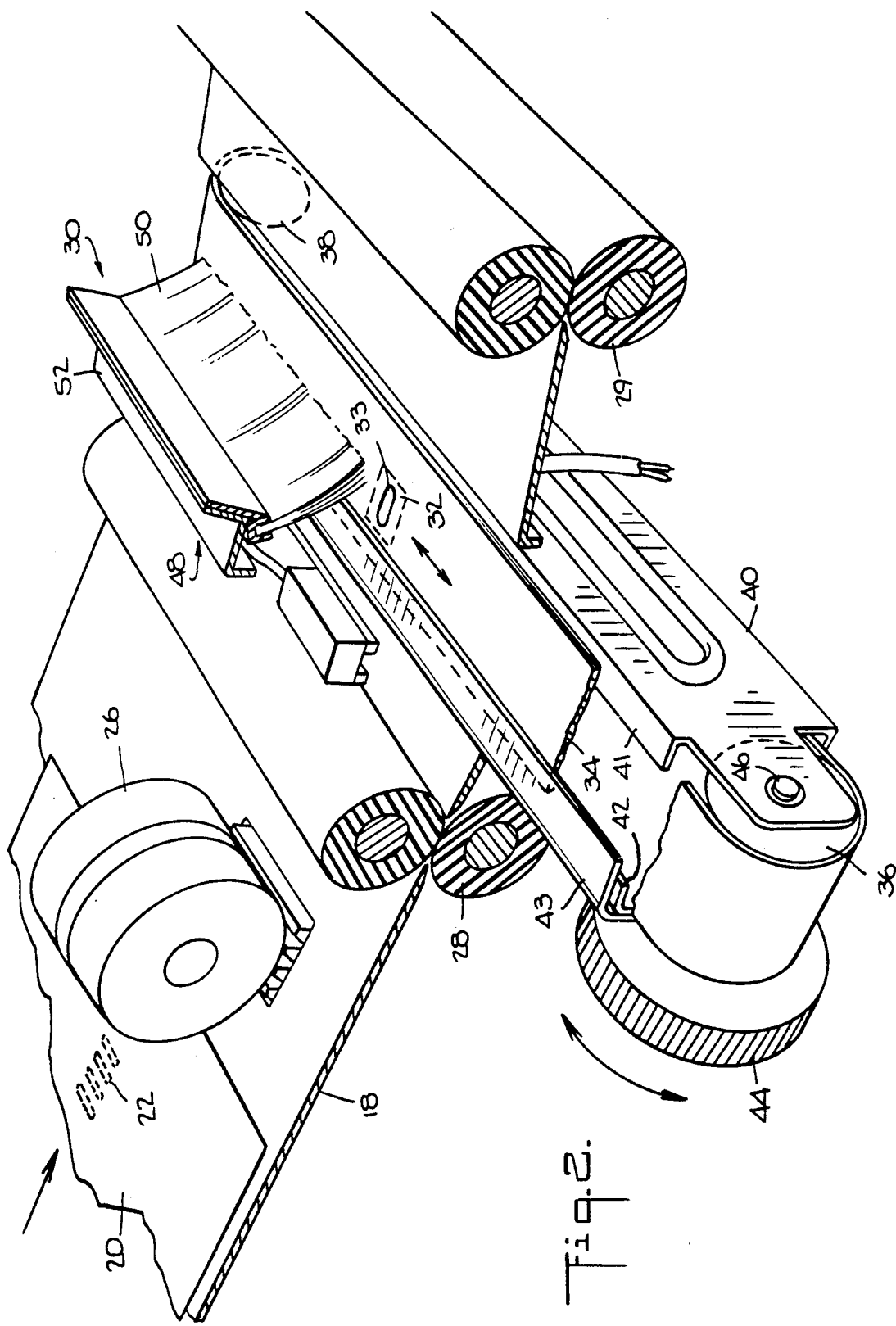
FIG. 2 is a perspective view of the apparatus of the present invention seen in FIG. 1.

In describing the preferred embodiment of the present invention, references are made to the drawings wherein there is seen an inserter generally designated 10 including a feed station generally designated 12 and a folder station generally designated 14. The feed station 12 includes side guides 16 and feed deck 18 for aligning and supporting a stack of documents to be fed. The documents 20 have encoded thereon a control code 22. As shown in FIGS. 1 and 2, enclosures 20 are stacked on feed deck 18 with the control codes 22 face down. Feed station 12 includes prefeed rollers 24 and feed rollers 26 for sequentially feeding the enclosures 20 from feed deck 18. A pair of accelerator rollers 28 operate at higher rate of speed than rollers 26, such that enclosures 20 are taken away from feed rollers 26 at a constant speed. Folder 14 includes a first pair of rollers 29 which operate at a higher rate of speed than accelerator rollers 28 such that each of enclosures 20 is held taut as the scanning operation is performed.

Located between feed station 12 and folder 14 is an scanner adjustment assembly 30 for adjustably positioning scanner 32 transversely along deck 18. In the preferred embodiment of the present invention, assembly 30 is an integral part of feed deck 18. It has been found that the present invention is useful for adjusting any type of scanner, including optical scanners, such as a barcode scanner as used in the preferred embodiment of the present invention.

Referring now to FIG. 2, the scanner 32 is attached to a flexible metal belt 34, which is looped around a pair of pulleys 36 and 38. In the preferred embodiment of the present invention, belt 34 is a stainless steel belt having appropriate thickness, for example 0.005 inches, allowing the belt to be contiguous and flush to deck 18. Pulley 36 is the drive pulley for rotating belt 34 transversely along the feed deck. Pulley 38 is an idle pulley. Belt 34 and pulleys 36 and 38 are fitted into cartridge 40, which is generally U-shaped and has support members 41 and 42 on the top side of the cartridge. Belt 34 rests on top of downstream support member 41 and upstream support member 42. A guide 43 fits over upstream support member 42 and the upstream edge of belt 34 to ensure that paper jams do not occur as enclosures 20 are conveyed over belt 34. As seen in FIGS. 1 and 2, assembly 30 is configured so that scanner 32 can be positioned anywhere along the width of deck 18.

Thumb wheel 44 is connected to shaft 46 running through pulley 36. As seen in FIG. 1, thumb wheel 44 protrudes through the side of inserter machine 10 for operator access. A brush assembly 48 is positioned over the scanner cartridge 40. Brush assembly 48 includes brush 50 and mounting bracket 52. Brush 50 provides adequate pressure on a document being scanned so that accurate scanning is achieved. In the preferred embodiment of the present invention, bracket 52 is mounted to the frame of the inserter using spring pins (not shown) to maintain adequate pressure. Other methods of mounting the brush assembly for scanning are well known. In the preferred embodiment of the present invention, brush 50 extends the entire width of feed deck 18 to accommodate any positioning of scanner 32. It will be understood by those skilled in the art that a shorter brush can be used if it is adjustably mounted so that it can be positioned over the aperture when the aperture's position has been adjusted.

There is a slot 60 located on one side of cartridge 40 through which the wires from scanner 32 pass through for electrical connection at another location in inserter 10. Also seen in FIGS. 3 and 4 are tension springs 62 which are used to maintain adequate tension of belt 34 around the pulleys 36 and 38 so as to maintain belt 34 flush against support members 41 and 42 of cartridge 40. In the preferred embodiment of the present invention, two springs are used to maintain proper tension on belt 34.

In operation, scanner 32 is positioned by an operator turning thumb wheel 44 to position scanner 32 at the proper position transversely along deck 18. Generally, a trial and error procedure will be implemented to accomplish this adjustment. The positioning of aperture 33 must be adjusted so that the edges of enclosures 20 are not jammed into aperture 33 when enclosures 20 are fed.

Unlike previously mentioned procedures requiring a service technician and tools to reposition the scanner, the present invention allows an operator to adjust the scanner position without the need for any tooling. When the thumbwheel is turned, the operator can monitor instantaneously when the scanner is in the correct position to read the code on the enclosure. It has been found that means other than thumbwheel 44 could be used to rotate belt 34. For example, a two pushbuttons can be used to control a motorized rotation of the belt, with each button causing belt 34 to rotate in one of the two directions.

In the preferred embodiment of the present invention, once scanner 32 is positioned, scanner 32 and belt 34 are held in place by the friction between belt 34 and support members 41 and 42 and pulleys 36 and 38. If vibrations cause the scanner position to move, then a known locking mechanism, such as a locking device on the thumbwheel, can be added to maintain the scanner position.

An alternate approach to the preferred embodiment of the present invention is scanning above deck 18. It has been found that scanner adjustment assembly can be mounted above deck 18 for adjustably positioning scanner 32 above the deck for topside scanning.

It will be appreciated by those skilled in the art that there has now been described a novel apparatus for adjustably positioning a scanner along the feed deck. Now this invention has been described in conjunction with specific embodiments thereof, many alternatives, modifications and variations will be apparent to those skilled in the art. Accordingly, it is intended to embrace all such alternatives, modifications and variations that follow within the spirit and scope of the appended claims.

What is claimed is:

1. In an inserting machine, an apparatus for adjustably positioning a scanner transversely along a paper path defined by a transport deck, comprising:
   a scanner;
   a belt having an aperture under which said scanner is secured to said belt;
   a cartridge interposed in a gap in the transport deck and extending at least the width of the transport deck, said cartridge having an opening longitudinally across a top portion thereof, said opening bounded by upstream and downstream support members of said cartridge, edges of said belt resting in part on said support members, said scanner projecting into a cavity in said cartridge, wherein said belt operatively is a continuation of said transport deck at said gap and said scanner scans through said aperture in said belt; and
   adjustment means located in said cartridge for moving said belt longitudinally in said cartridge wherein said scanner is positioned transversely along the paper path.

2. The apparatus according to claim 1 wherein said cartridge also includes a guide plate situated above the edge of said belt resting on said upstream support member, said guide plate being contiguous with said transport deck wherein said guide plate and said belt operatively are a continuation of said transport deck at said gap.

3. The apparatus according to claim 1 wherein said belt comprises an endless stainless steel belt.

4. The apparatus according to claim 1 wherein said belt comprises a stainless steel belt connected at both ends by a spring means.

5. The apparatus according to claim 1 wherein said adjustment means includes a driven pulley rotatably mounted at one end of said cartridge and an idle pulley rotatably mounted at the other end of said cartridge, said belt being suspended around said pulleys whereby rotation of said driven pulley causes said belt to move transversely across the paper path.

6. The apparatus according to claim 5 wherein said adjustment means further includes a thumbwheel operatively coupled to said driven pulley for rotating said driven pulley.

7. The apparatus according to claim 1, further comprising brush means situated above said cartridge for applying pressure to material being conveyed over said belt.

8. The apparatus according to claim 1 wherein said cartridge is removable from said gap in the transport deck.

9. In an inserting machine, an apparatus for adjustably positioning a scanner transversely along a paper path defined by a transport deck, comprising:

a cartridge insertable into a gap in the transport deck, said cartridge comprising:

first and second support members defining an open side of said cartridge;

a pair of pulleys rotatably mounted at opposite ends of said cartridge;

a belt suspended around said pulleys, edges of said belt resting in part against said support members, said belt having an aperture with a scanner secured thereto for scanning through said aperture;

a guide plate situated above said first support member, an edge of said belt resting between said guide plate and said first support member; and adjustment means operatively coupled to one of said pulleys for rotating said pulley wherein said belt moves frictionally in accordance with the rotation of the pulleys.

10. The apparatus according to claim 9 wherein when said cartridge is inserted into the the gap in transport deck, said guide plate is contiguous with the upstream section of said transport deck and the downstream edge of said belt is contiguous with said downstream section of said transport deck whereby said cartridge operatively is a continuation of the transport deck in the gap.

11. The apparatus according to claim 10 wherein said adjustment means further includes a thumbwheel operatively coupled to one of said pulleys for rotating said belt over said pulleys.

* * * * *